United States Patent [19]

Podgorski

[11] Patent Number: 4,670,691

[45] Date of Patent: Jun. 2, 1987

[54] GETTER FOR A RING LASER ANGULAR RATE SENSOR

[75] Inventor: Theodore J. Podgorski, St. Paul, Minn.

[73] Assignee: Honeywell Inc., Minneapolis, Minn.

[21] Appl. No.: 767,693

[22] Filed: Aug. 21, 1985

Related U.S. Application Data

[63] Continuation of Ser. No. 449,901, Dec. 15, 1982, abandoned.

[51] Int. Cl.<sup>4</sup> ............................................. H01J 7/18
[52] U.S. Cl. .................................... 313/549; 313/558; 372/94
[58] Field of Search ............... 313/549, 547, 558, 561, 313/562; 372/94, 87, 88

[56] References Cited

U.S. PATENT DOCUMENTS

| 2,433,962 | 1/1948 | Steiger | 313/549 |
| 3,543,085 | 11/1970 | Pflanz | 313/549 X |
| 4,282,495 | 8/1981 | Ljung | 372/94 X |

FOREIGN PATENT DOCUMENTS

2091481A  7/1982  United Kingdom ............... 313/549

Primary Examiner—David K. Moore
Assistant Examiner—K. Wieder
Attorney, Agent, or Firm—Robert A. Pajak

[57] ABSTRACT

A gas discharge device is provided with a getter film by sputtering an electrode used normally for device operation.

5 Claims, 1 Drawing Figure

U.S. Patent        Jun. 2, 1987        4,670,691
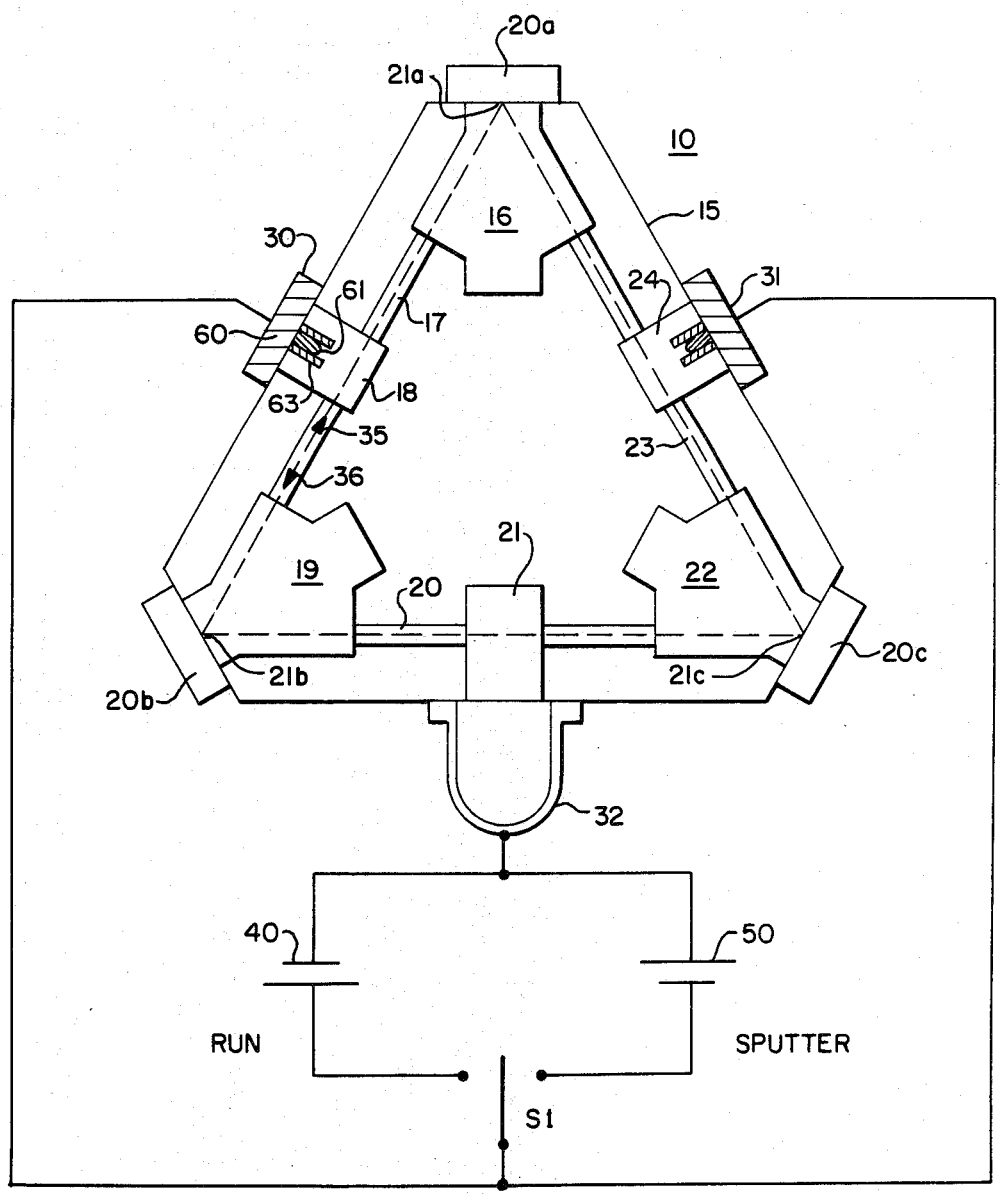

GETTER FOR A RING LASER ANGULAR RATE SENSOR

This application is a continuation of application Ser. No. 449,901, filed Dec. 15, 1982, now abandoned.

This invention relates to gas discharge devices and a method for introducing getter material into such devices, and more particularly to a method an apparatus useful with ring laser resonant cavities.

Alkaline-earth materials, commonly barium, strontium, calcium, and titanium, may be used as getters to scavenge residual contaminant gases in high vacuum devices and gas discharge devices such as lasers which contain rare earth gases such as helium and neon. Because of the extreme reactiveness of these materials with air, commercially available getter material is usually alloyed with aluminum or other materials in order to reduce their reactiveness.

In ring laser resonant cavity structures commonly employed as angular rate sensors, a mechanically thermally stable block provides a plurality of interconnected cavities which in turn provide an optical closed-loop path. The cavities are evacuated and then filled with helium and neon under low pressure. Commonly two anodes and one cathode are symmetrically positioned along the optical closed-loop path in communication with the cavity to provide a pair of ionization current paths thereby creating counter-propagating laser beams. Such devices as these usually include a getter. However, ring laser structures used as angular rate sensors are particularly sensitive to any particulate matter or residue of getter material which may be included as a step in the production of such devices.

In order to provide a getter, prior art ring laser structures and processes include a getter assembly consisting of a snap ring welded to a getter pan containing the getter material. This assembly is clamped inside the optical cavity of the ring laser structure. The getter material is flashed and the cavity closed off at its gas-filling pinch tube leaving the getter assembly inside the cavity. This system has several disadvantages. Particles are shed from the getter assembly due to shock, vibration, and/or temperature variations. This particulate matter contaminates the laser and reduces the useful life thereof. Further, a certain amount of contaminated gases is emitted from the getter material just before it flashes which also reduces the life of the laser.

An object of this invention is an improved method for depositing getter material into an evacuated cavity of a gas discharge device and specifically a cavity forming an optical closed-loop path of a ring laser angular rate sensor.

It is a further object of the invention to provide an apparatus and method for depositing getter material in a gas discharge device without flashing the getter material.

Briefly, this invention contemplates the provision of providing an electrode composed of, at least in part, getter material capable of being sputtered. The electrode may then provide both the function of establishing a getter film in the structure by sputtering and the function of establishing a gas discharge current by serving as an anode in normal discharge current operation.

DESCRIPTION OF THE DRAWINGS

FIG. 1 is a schematic drawing of one embodiment of the invention.

DESCRIPTION OF THE INVENTION

FIG. 1 illustrates a ring laser angular rate sensor apparatus 10. The assembly includes a mechanically and thermally stable block 15 such as fused quartz and the like. Block 15 provides plurality of interconnected cavities or tunnels including cavities 16, 17, 18, 19, 20, 21, 22, 23, and 24. Cavities 17, 20, and 23 form, at least in part, a triangular shaped optical closed-loop path. At each of the corners of the block is provided a wave reflecting means which is illustrated in FIG. 1 by means 20a, 20b, and 20c, which respectively provide wave reflecting surfaces 21a, 21b, and 21c. The ring laser angular rate sensor apparatus also includes a first anode 30 in communication with cavity 18 and cavity 17, a second anode 31 in communication with cavity 24 and cavity 23, and a cathode 32 in communication with cavities 21 and 20.

The apparatus as so far described is well known in the art and is specifically described U.S. Pat. No. 3,390,606, entitled "Control Apparatus" by Podgorski and is assigned to the same assignee as the present application.

Of course, all of the elements described above, including the mirrors, cathodes, and the anodes are all tightly sealed to the block so that the gas within the plurality of interconnecting cavities therein is maintained at the proper pressure and free from contamination. In order to generate counter-propagating laser beams 35 and 36 indicated by the triangular shaped dashed line, a positive potential relative to cathode 32 is applied to anodes 30 and 31 so as to produce an ionization current between the anodes and the cathode, along the shortest path, creating a plasma, and thereby generating counter-propagating laser beams in a well known manner.

A cross-section of the details of both anodes 30 and 31 in FIG. 1, which are substantially identical, will now be described. Anode 30 comprises a head portion 60 arranged in such a manner to engage block 15 surrounding cavity 18 for sealing off the surrounding atmosphere from the gas filled cavity. Extending from head portion 60 is a stem portion 61 disposed in cavity 18. Substantially surrounding stem portion 61 is control guide 63 which may be cylindrical in shape. Also extending from head portion 60 is guiding means 63.

Stem portion 61 is intended to be composed of, at least in part, a getter material, for example, an alloy of titanium. Guiding means 63 may be anodized aluminum having a function as will be described below. Head portion 60 is adapted to have terminal means for connecting anode 60 to an electric potential source.

In FIG. 1, switch S1 and the connections therefrom are shown for ease in understanding the invention. Switch S1 is adapted to be connected to electric potential source 40 in the run condition, and is adapted to be connected to electric potential source 50 in the sputter condition. Source 40 is arranged in such a manner so that when switch S1 is in the run condition, a positive polarity electric potential is applied to anodes 30 and 31 relative to cathode 32. On the other hand when switch S1 is in the sputter condition, source 50 is arranged in such a manner that a negative electric potential is applied to anodes 30 and 31 relative to cathode 32.

In operation, the cavities of block 15 are filled with a sputtering gas such as a HeNe mixture or the like for providing a gas discharge. The required value of potential source 50 is dependent upon the sputtering gas, the position and shape of the electrode(s), and the getter material selected. Typically, it may be in the order of 1KV. When switch S1 is in the sputter condition and if source 50 is sufficiently large, the polarity is such that a stream of positive ions will bombard the stem portion 61 composed of some getter material. Atoms of the getter material are then ejected in various directions leaving the stem portion surface in an abraded and roughened condition. The ejected atoms cling firmly to the inner cavity walls forming a uniform getter film thereon. Since the block is usually made of a silica based material, a getter film is enhanced. In a practical embodiment, switch S1 is only in the sputter condition for a sufficient length of time to provide an appropriate amount of a getter film on the inner cavity walls. Upon completion of the sputtering process, the sputtering gas may be removed from the block cavities, and refilled with an appropriate mixture of helium neon normally associated with ring laser operations.

When switch S1 is in a run condition, the positive potential is applied to the anodes 30 and 31 relative to cathode 32, and the sputtering process is not obtained in the run condition since it is no longer attacked by positive ions since they are directed toward the cathode 32. Furthermore, the potential of source 40 in normal laser operation is much less than that required for sputtering. Therefore, in the run condition, no sputtering takes place and no further degradation of the getter material anode stem portion 61 occurs.

As noted in FIG. 1, the sputtering guide 63 surrounding the getter material stem portion 61 is provided so that only selected surfaces of the stem portion are sputtered to control the amount of degradation of the getter material as well as focus the sputtering away toward cavity 17.

It is within the scope of this invention, that a wide choice of selected materials may be used for the getter material stem portion 61. Depending upon the appropriate alloy selected for stem portion 61, the sputtering guide 63 may not be required. Further, the head portion as well as the stem portion may be composed of a single body getter material alloy.

Although the present invention has been shown with a triangular shaped ring laser structure, it is within the scope of the present invention that the getter anode used in the manner described herein may be applied to other ring laser block configurations and/or structures, as well as any gas discharge device or the like.

The embodiments of the invention in which an exclusive property or right is claimed are defined as follows:

1. A ring laser angular rate sensor comprising:
   a mechanically thermally stable block for providing a cavity defined substantially by inner wall portions for containing a primary gas and potentially including gas contaminants, said cavity including a plurality of interconnected cavity portions providing a closed-loop path; and
   at least a first anode and a cathode, in communication with said cavity and said gas therein, and in which said anode is composed of, at least in part, a getter material, said first anode and said cathode adapted to be connected, in the operate condition, to an electrical potential source for passage of electrical current therebetween through said gas and of sufficient magnitude to produce a pair of counter-propagating laser beams along said closed-loop path.

2. The gas discharge device of claim 1 wherein said getter material is selected from the alkaline-earth group.

3. The gas discharge device of claim 1 wherein said getter material is selected from a group consisting of strontium, barium, titanium, and calcium.

4. The gas discharge device of claim 1 wherein said first anode and said cathode are adapted to be connected to an electrical potential source of polarity and sufficient magnitude to sputter said etter material onto portions of said cavity inner wall portions.

5. The sensor of claim 2 wherein said first anode includes:
   head portion means capable of providing a seal between said block and a selected cavity potion of said cavity;
   stem portion means fixed to said head portion means and extending means composed of, at least in part, said getter material.

* * * * *

UNITED STATES PATENT AND TRADEMARK OFFICE
CERTIFICATE OF CORRECTION

PATENT NO.  : 4,670,691

DATED       : June 2, 1987

INVENTOR(S) : THEODORE J. PODGORSKI

It is certified that error appears in the above-identified patent and that said Letters Patent is hereby corrected as shown below:

```
Column 4, line 33, cancel "etter" and substitute
      --getter--

Column 4, line 41, insert --into a portion of a said
      cavity, said stem portion-- after "extending"
```

Signed and Sealed this

Twenty-second Day of September, 1987

Attest:

DONALD J. QUIGG

Attesting Officer   Commissioner of Patents and Trademarks